(12) United States Patent
Bø

(10) Patent No.: US 8,400,756 B2
(45) Date of Patent: Mar. 19, 2013

(54) CAPACITOR ARRANGED IN A HIGH PRESSURE ENVIRONMENT

(75) Inventor: Ove Bø, Tanem (NO)

(73) Assignee: Siemens Aktiengesellschaft, Munich (DE)

( * ) Notice: Subject to any disclaimer, the term of this patent is extended or adjusted under 35 U.S.C. 154(b) by 515 days.

(21) Appl. No.: 12/602,175

(22) PCT Filed: May 27, 2008

(86) PCT No.: PCT/EP2008/056435
§ 371 (c)(1),
(2), (4) Date: Nov. 30, 2009

(87) PCT Pub. No.: WO2008/145639
PCT Pub. Date: Dec. 4, 2008

(65) Prior Publication Data
US 2010/0208415 A1 Aug. 19, 2010

(30) Foreign Application Priority Data
May 29, 2007 (EP) .................................. 07010648

(51) Int. Cl.
*H01G 4/38* (2006.01)
*H01G 4/04* (2006.01)
*H01G 2/00* (2006.01)
*H01G 4/255* (2006.01)
*H01G 5/019* (2006.01)

(52) U.S. Cl. .......................... 361/328; 361/327; 361/272
(58) Field of Classification Search .................. 361/272, 361/326, 327, 328
See application file for complete search history.

(56) References Cited

U.S. PATENT DOCUMENTS

| 3,166,446 | A | 1/1965 | Hutchison | |
|---|---|---|---|---|
| 5,876,872 | A | 3/1999 | Feezor | |
| 7,847,189 | B2 * | 12/2010 | Findeisen | 174/50 |

FOREIGN PATENT DOCUMENTS

| GB | 1604978 A | 12/1981 |
|---|---|---|
| WO | WO 0076013 A1 | 12/2000 |
| WO | WO 0241336 A1 | 5/2002 |
| WO | WO2007003595 * | 1/2007 |
| WO | WO 2007003595 A1 | 1/2007 |

* cited by examiner

*Primary Examiner* — Eric Thomas
*Assistant Examiner* — Arun Ramaswamy
(74) *Attorney, Agent, or Firm* — King & Spalding, L.L.P.

(57) ABSTRACT

An electronic component (2) for application in high pressure environments has a casing (4) entirely filled with an electrically insulating first fluid (F1), whereby the casing (4) exhibits or connects to a volume compensation unit for compensating a volume change of the first fluid (F1). An electric device (1) has at least one such electronic component (2) in a device housing (10), whereby the device housing (10) is filled with a second fluid (F2).

10 Claims, 2 Drawing Sheets

CAPACITOR ARRANGED IN A HIGH PRESSURE ENVIRONMENT

CROSS-REFERENCE TO RELATED APPLICATIONS

This application is a U.S. National Stage Application of International Application No. PCT/EP2008/056435 filed May 27, 2008, which designates the United States of America, and claims priority to EP Application No. 07010648.9 filed May 29, 2007, the contents of which are hereby incorporated by reference in their entirety.

TECHNICAL FIELD

The present invention concerns a capacitor arranged in a high pressure environment.

BACKGROUND

Oil production and communication applications in subsea environments require electric devices able to withstand high pressure. However, electronic components, such as capacitors, particularly conventional electrolytic capacitors or MP capacitors are not applicable under high pressure conditions. Such capacitors exhibit electrodes stacked and rolled up in a casing partially filled with an electrolytic fluid, which would collapse under high pressure. Electric devices containing such electronic components are often designed with a pressure proof housing in order to keep the interior of the housing at atmospheric pressure (1 atm). Due to the high pressure in deep sea environments this housing needs to be adequately massive thus causing high costs. Further drawbacks are the high effort for sealing the housing and the feedthroughs for electrical connections to the outside. In other known approaches the housing of such electric devices is filled with an electrically insulating fluid. Although this allows a lightweight design of the device housing, the risk of damage to the capacitors persists because they are exposed to the ambient pressure transmitted by fluid in the device housing.

U.S. Pat. No. 5,876,872 discloses a battery with at least one electrochemical cell for use and recharging underwater, particularly seawater, at a pressure at or greater than atmospheric pressure. The battery has an anode, a cathode and an associated electrolyte in a housing. A pressure compensating fluid with a greater density than water separates the electrolyte from the surrounding water.

WO 00/76013 A1 discloses a battery for underwater use comprising a plurality of elements. Each element is provided with an aperture communicating with an external liquid environment. Each element is filled with liquid means for separating an electrolyte inside the element from the external liquid environment.

SUMMARY

According to various embodiments, an improved capacitor can be provided which can be arranged in a high pressure environment and an improved electric device containing at least one such capacitor.

According to an embodiment, a capacitor can be arranged in a high pressure environment, wherein the capacitor may comprise a casing entirely filled with an electrically insulating first fluid, wherein the casing exhibits or connects to a volume compensation unit for compensating a volume change of the first fluid, the volume compensation unit comprises a reservoir partially filled with the first fluid and connected to the casing by means of a tube or hose, and wherein the first fluid is separated from a second fluid surrounding the reservoir by a flexible impermeable membrane.

According to a further embodiment, the first fluid in the reservoir may have a slight overpressure compared to an ambient pressure in the second fluid outside the reservoir. According to a further embodiment, the reservoir can be partially filled with air or gas.

According to yet another embodiment, an electric device may comprise at least two such capacitors in a device housing, wherein the device housing is filled with a second fluid and wherein at least two capacitors are connected to a common reservoir by a respective tube or hose.

BRIEF DESCRIPTION OF THE DRAWINGS

The invention will now be described in more detail with reference to the accompanying drawings, in which.

DETAILED DESCRIPTION

Figure 1:
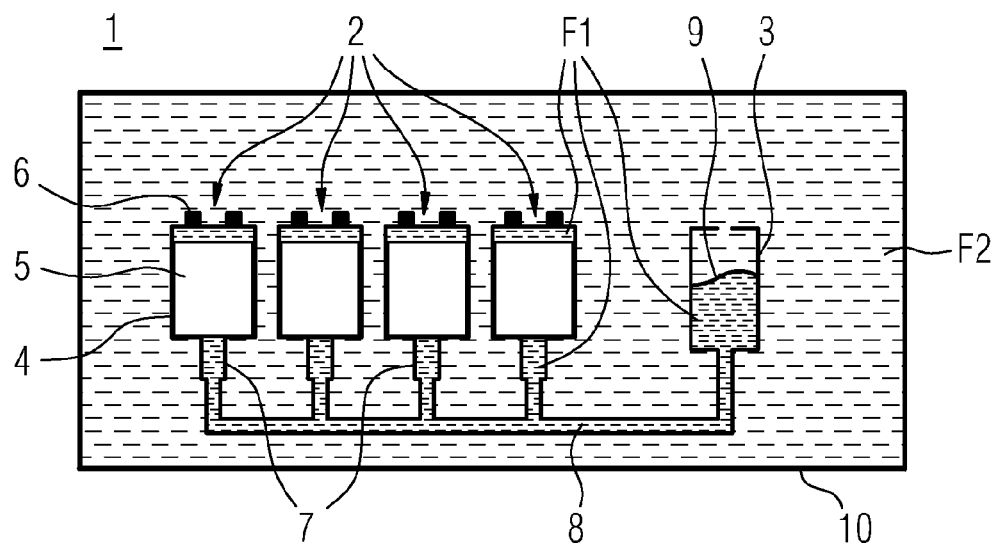
FIG. 1 is a schematic of an electric device for high pressure applications with four electronic components and a reservoir.

An electronic component according to various embodiments for application in high pressure environments comprises a casing entirely filled with an electrically insulating first fluid. The casing is equipped with or connected to a volume compensation unit for compensating a volume change of the first fluid. "Entirely filled" means that there are no or only marginal amounts of residual air or gas in the casing in order to avoid compressing them under high pressure which would lead to a collapse of the casing. The volume compensation unit adapts the fluid volume inside the casing to the outside pressure, so the inside pressure and the outside pressure are balanced. Volume fluctuations due to temperature changes can be compensated the same way. Thus a wall of the casing is relieved from mechanical stress so the casing will not collapse regardless of the outside pressure. Particularly, the accordingly designed electronic component is a capacitor, such as an electrolytic capacitor or an MP capacitor. Nevertheless the design may be applied to capsulated inductors as well.

The electronic component according to various embodiments is particularly disposed in an electric device exhibiting a device housing filled with a second fluid. The ambient pressure outside the device housing is thus forwarded to the electronic component. The electric device can comprise more than one electronic component according to various embodiments. The device housing can be designed as a light weight canister because it does not have to withstand mechanical stress due to high pressure. Lightweight means thinner walls of the device housing thus reducing costs and providing better cooling to parts inside the device housing. The second fluid should also be electrically insulating. It can serve as a coolant for semiconductors and other parts inside the electric device. As the pressure inside and outside the device casing is essentially the same under all conditions, the risk of leakage of seawater into the device is tremendously reduced.

In an embodiment the volume compensation unit comprises a valve allowing the first fluid to flow out of the casing or into the casing. The term valve is supposed to mean a constricted passage allowing the first fluid to pass freely or by a light differential pressure. Such an electronic component is preferably used in an electric device filled with a second fluid which is the same as the first fluid. This embodiment is particularly simple and cost-saving.

In an advantageous embodiment the valve comprises a filter keeping impurities and pollution from entering the electronic component.

In another embodiment the volume compensation unit comprises a reservoir at least partially filled with the first fluid and connected to the casing by a tube or hose. The first fluid is separated from a second fluid surrounding the reservoir by a flexible impermeable membrane. The reservoir can be arranged in any place inside the device housing or attached directly to the casing of the electronic component. In this embodiment the first fluid flows from the electronic component to the reservoir or vice versa depending on the pressure conditions. The reservoir may exhibit a slight overpressure compared to the ambient pressure in order to make sure the electronic component is always entirely filled with the first fluid. This can be achieved by partially filling the reservoir with air or gas. The size of the reservoir has to be adequate in order to keep the electronic components filled regardless of the ambient pressure. Two or more electronic components can be connected to a common reservoir by respective tubes or hoses.

In another embodiment the volume compensation unit is formed as an at least partially elastic wall of the casing, thus enabling the casing to adapt to various volumes dependent on the pressure. For instance the partially flexible wall can comprise a bellows.

In a embodiment the device housing exhibits a double wall. A double housing yields an improved protection of the electric device from water leakages.

In an embodiment, the electric device is applied in a deep sea environment, e.g. in oil production or communication installations. Compared to conventional devices having a rather heavy device casing keeping the interior at atmospheric pressure in order to keep the capacitors from crushing, the electric device according to various embodiments exhibits a lightweight device casing. The efforts for sealing the interior in order to keep sea water outside can be kept relatively low because of the non-existing difference between the ambient pressure and the interior pressure. At the same time a risk for damaging the electronic components, particularly the capacitors under high pressure inside the device is virtually zero.

FIG. 1 shows a schematic of an electric device 1 for high pressure applications with four electronic components 2 (particularly capacitors) and a reservoir 3 serving as part of a volume compensation unit.

Each electronic component 2 comprises a casing 4, electrodes 5 stacked and rolled up and two electric terminals 6. The casing 4 is entirely filled with an electrically insulating first fluid F1, so no or only marginal residue air or gas is left inside.

All electronic components 2 are connected to the reservoir 3 with a respective tube 7 flowing into a common tube 8, which for its part leads to the common reservoir 3. A part of the reservoir 3 below a flexible impermeable membrane 9 and the tubes 7, 8 are also filled with the first fluid F1. The electric device 1 exhibits a device housing 10 keeping water outside the electric device 1. The device housing 10 is filled with a second fluid F2 as well as another part of the reservoir 3 above the membrane 9, the reservoir 3 having an opening to the outside. When the device housing 10 is subjected to a change in pressure, e.g. by submerging it, this change is forwarded to the casings 4 of the electric components 2 by the second fluid F2. At the same time the pressure change is forwarded to the membrane 9 thus subjecting the first fluid F1 behind the membrane 9 and consequently inside the housings or casings 4 the same pressure, so the pressure inside and outside the casings 4 is balanced.

Figure 2:
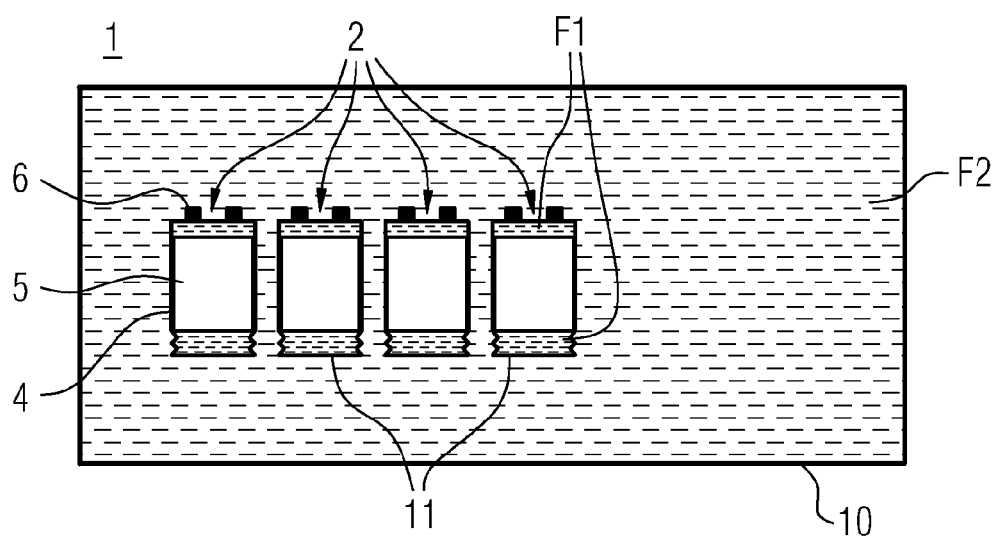
FIG. 2 is a schematic of an electric device for high pressure applications with four electronic components each one equipped with a bellows.

FIG. 2 shows a schematic of another embodiment. An electric device 1 for high pressure applications contains four electronic components 2 (particularly capacitors). Each electronic component 2 comprises a casing 4, electrodes 5 stacked and rolled up and two electric terminals 6.

The casing 4 is entirely filled with an electrically insulating first fluid F1, so no or only marginal residue air or gas is left inside. The electric device 1 exhibits a device housing 10 keeping water outside the electric device 1.

The device housing 10 is filled with a second fluid F2. When the device housing 10 is subjected to a change in pressure, e.g. by submerging it, this change is forwarded to the casings 4 of the electric components 2 by the second fluid F2. In order to keep the casings 4 from crushing the pressure inside them has to be equal to the pressure outside. Instead of the reservoir 3 from FIG. 1, serving as part of a volume compensation unit the volume compensation is achieved by a partially elastic casing 4 of each electronic component 2. Therefore each casing 4 comprises a respective bellows 11, which forwards the pressure outside the casing 4 to the first fluid F1 inside, so the pressure inside and outside the casings 4 is balanced.

Figure 3:
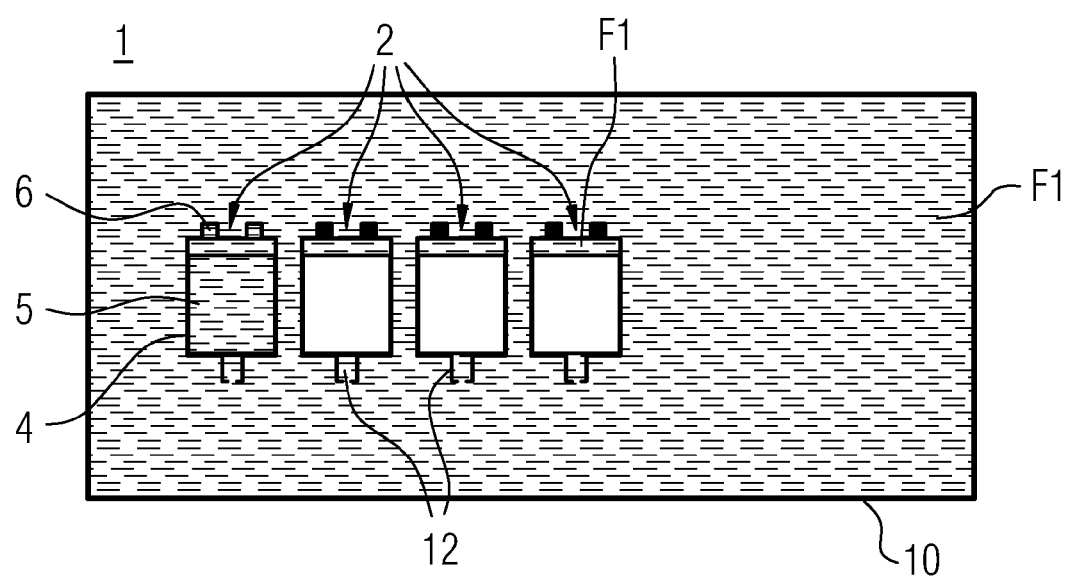
FIG. 3 is a schematic of an electric device for high pressure applications with four electronic components each one equipped with a valve.

FIG. 3 shows a schematic of yet another embodiment. An electric device 1 for high pressure applications contains four electronic components 2 (particularly capacitors). Each electronic component 2 comprises a casing 4, electrodes 5 stacked and rolled up and two electric terminals 6. The casing 4 is entirely filled with an electrically insulating first fluid F1, so no or only marginal residue air or gas is left inside.

The electric device 1 exhibits a device housing 10 keeping water outside the electric device 1. The device housing 10 is also filled with the first fluid F1. When the device housing 10 is subjected to a change in pressure, e.g. by submerging it, this change is forwarded to the casings 4 of the electric components 2 by the first fluid F2 outside the casings 4. In order to keep the casings 4 from crushing the pressure inside them has to be equal to the pressure outside. The volume compensation is achieved by a valve 12 in each casing 4 allowing the first fluid F1 to flow freely or by a slight overpressure in or out the casing 4 dependent on the pressure change. Each valve 12 is equipped with a filter (not shown) for keeping pollution outside the electronic components 2.

The second fluid F2 can be the same as the first fluid F1 in all embodiments.

The device housing 10 can exhibit double walls. Each wall of the device housing can be provided with volume compensation units.

The above shown embodiments for electronic components 2 can be applied to other components, such as inductors, as well.

The electric device 1 may be applied in a deep sea environment, particularly in oil production or communication installations. E.g. it can serve as a control unit or an amplifier.

What is claimed is:

1. A capacitor adapted to be operated in a deep sea, high-external pressure environment, the capacitor comprising a capacitor casing entirely filled with an electrically insulating first fluid, wherein the capacitor casing exhibits or connects to a volume compensation unit for compensating a volume change of the first fluid resulting from external pressure, wherein the volume compensation unit comprises a reservoir at least partially filled with the first fluid and in fluid communication with the capacitor casing, and wherein the first fluid is separated from a second fluid surrounding the reservoir, the volume compensation unit adapting the fluid volume inside the capacitor casing to the external pressure so that pressure in the capacitor casing and the external pressure in the second fluid are balanced.

2. The capacitor according to claim 1, wherein the first fluid in the reservoir has a slight overpressure compared to an ambient pressure in the second fluid outside the reservoir.

3. The capacitor according to claim 2, wherein the reservoir is partially filled with air or gas.

4. An electric device comprising at least two capacitors according to claim 1 in a device housing, wherein the device housing is filled with a second fluid and wherein at least two capacitors are connected to a common reservoir by a respective tube or hose.

5. The device according to claim 4, wherein for each capacitor the first fluid in the reservoir has a slight overpressure compared to an ambient pressure in the second fluid outside the reservoir.

6. The device according to claim 5, wherein for each capacitor the reservoir is partially filled with air or gas.

7. A method for providing a capacitor adapted to be operated in a deep sea environment, comprising:
　arranging the capacitor in a capacitor casing,
　entirely filling the capacitor casing with an electrically insulating first fluid,
　connecting or exhibiting the capacitor casing to a volume compensation unit for compensating a volume change of the first fluid resulting from outside pressure, wherein the volume compensation unit comprises a reservoir at least partially filled with the first fluid and in fluid communication with the capacitor casing, and
　separating the first fluid from a second fluid surrounding the reservoir, the volume compensation unit adapting the fluid volume inside the capacitor casing to the outside pressure so that pressure in the capacitor casing and the outside pressure in the second fluid are balanced.

8. The method according to claim 7, wherein the first fluid in the reservoir has a slight overpressure compared to an ambient pressure in the second fluid outside the reservoir.

9. The method according to claim 8, wherein the reservoir is partially filled with air or gas.

10. A method for providing capacitors in an electric device for use in a deep sea, high outside pressure environment comprising:
　arranging first and second capacitors in a first and second capacitor casing, respectively,
　entirely filling the capacitor casings with an electrically insulating first fluid,
　connecting or exhibiting the capacitor casings to a volume compensation unit for compensating a volume change of the first fluid resulting from outside pressure, wherein the volume compensation unit comprises a reservoir at least partially filled with the first fluid and in fluid communication with the capacitor casing;
　separating the first fluid from a second fluid surrounding the reservoir; and
　arranging the first and second capacitors in a device housing, wherein the device housing is filled with the second fluid and wherein the at least two capacitors are in fluid communication with a common reservoir.

* * * * *